United States Patent
Stefani et al.

(10) Patent No.: US 9,121,424 B2
(45) Date of Patent: Sep. 1, 2015

(54) FOLD FORMATION OF A COMPONENT CONNECTION

(75) Inventors: Uwe Stefani, Sindelfingen (DE); Ulrich Walther, Magstadt (DE)

(73) Assignee: Daimler AG, Stuttgart (DE)

( * ) Notice: Subject to any disclaimer, the term of this patent is extended or adjusted under 35 U.S.C. 154(b) by 133 days.

(21) Appl. No.: 13/808,513

(22) PCT Filed: Jul. 1, 2011

(86) PCT No.: PCT/EP2011/003282
§ 371 (c)(1),
(2), (4) Date: Feb. 4, 2013

(87) PCT Pub. No.: WO2012/003948
PCT Pub. Date: Jan. 12, 2012

(65) Prior Publication Data
US 2013/0129410 A1  May 23, 2013

(30) Foreign Application Priority Data
Jul. 6, 2010 (DE) .......................... 10 2010 026 259

(51) Int. Cl.
*F16B 5/08* (2006.01)
*B60J 5/04* (2006.01)

(52) U.S. Cl.
CPC ................. *F16B 5/08* (2013.01); *B60J 5/0469* (2013.01); *Y10T 403/471* (2015.01)

(58) Field of Classification Search
CPC ... B60J 5/0469; B21D 39/021; B62D 27/026; F16B 5/08

USPC .................................. 403/265, 268, 270–272
See application file for complete search history.

(56) References Cited

U.S. PATENT DOCUMENTS

| 2,591,994 | A | * | 4/1952 | Alexander | 228/137 |
| 4,738,560 | A | * | 4/1988 | Brussow et al. | 403/268 |
| 4,916,284 | A | * | 4/1990 | Petrick | 219/121.64 |
| 6,696,147 | B1 | * | 2/2004 | Herring et al. | 428/323 |

(Continued)

FOREIGN PATENT DOCUMENTS

| DE | 16 27 719 A1 | 3/1972 |
| DE | 102 48 795 A1 | 5/2004 |

(Continued)

OTHER PUBLICATIONS

Corresponding International Search Report with English Translation dated Dec. 2, 2011 (four (4) pages).

(Continued)

*Primary Examiner* — Joshua Kennedy
(74) *Attorney, Agent, or Firm* — Crowell & Moring LLP

(57) ABSTRACT

A component connection between a first component and a second component involves the first component having a fold that at least sections of an edge region of the second component engage, and at least sections of the components being bonded to one another by an adhesion agent in the region of the fold. An end region of the fold is shaped in such a way that a distance between the first and second components increases towards the end region, so that a funnel-shaped, outward-opening gap is formed between the two components, in which the surfaces of the two components are either joined to each other by the adhesion agent or provided with a coating across their entire surface area.

6 Claims, 1 Drawing Sheet

(56) References Cited

U.S. PATENT DOCUMENTS

Figure 1:
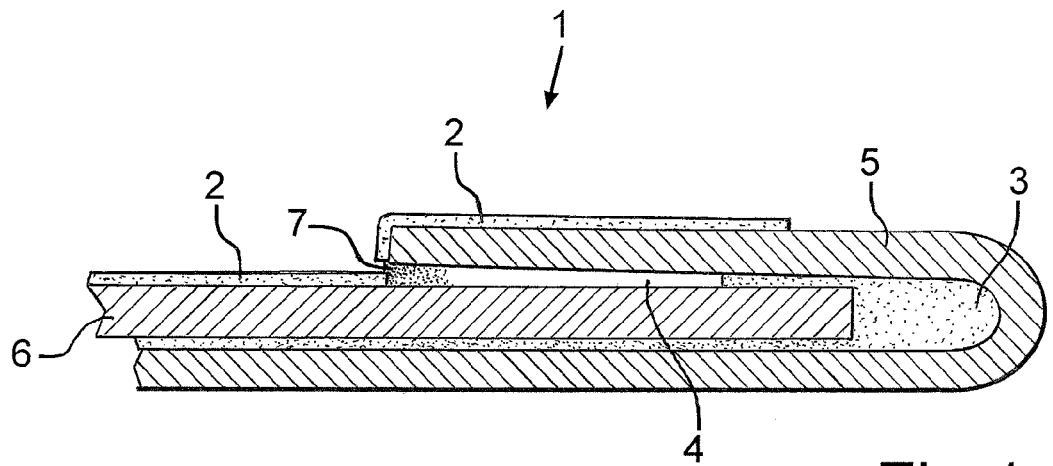

| | | | |
|---|---|---|---|
| 7,422,652 B2 * | 9/2008 | Ondrus et al. | 156/322 |
| 2004/0163771 A1 * | 8/2004 | Herring et al. | 156/575 |
| 2004/0238985 A1 | 12/2004 | Beckord | |
| 2012/0270011 A1 * | 10/2012 | Spencer | 428/124 |
| 2014/0117707 A1 * | 5/2014 | Yamada et al. | 296/146.9 |

FOREIGN PATENT DOCUMENTS

| | | | | |
|---|---|---|---|---|
| DE | 102009014192 A1 | * | 11/2009 | B21D 39/02 |
| DE | 102013000868 | * | 3/2014 | B62D 27/02 |
| GB | 2 455 292 A | | 6/2009 | |
| JP | 2004-535921 A | | 12/2004 | |
| JP | 2005-83673 A | | 3/2005 | |
| JP | 2011-505478 A | | 2/2011 | |
| WO | WO 94/21740 A1 | | 9/1994 | |
| WO | WO 2011/084378 A1 | | 7/2011 | |

OTHER PUBLICATIONS

German-language Written Opinion dated Dec. 2, 2011 (PCT/ISA/237) (seven (7) pages).
Japanese-language Office Action dated Jan. 22, 2014 (two (2) pages).
Office Action in Chinese Patent Application No. 201180033216.2 dated Sep. 23, 2014.

* cited by examiner

FOLD FORMATION OF A COMPONENT CONNECTION

BACKGROUND AND SUMMARY OF THE INVENTION

Exemplary embodiments of the present invention relate to a component connection between a first component and a second component, the first component having a fold which at least sections of an edge region of the second component engage, and at least sections of the components being bonded to one another by an adhesion agent in the region of the fold.

A fold, as for example used in sheet metal joints, involves an indentation or fold of a first part, which is engaged by an edge or projection of a second part to be joined to the first part. Depending on loading and application, folds of different designs are possible, including single or double folds, vertical or horizontal folds or covering folds. When joining sheet metal parts, the durability of the fold is primarily determined by the compression with which the fold seam is closed.

To protect a folded connection against external influences, folded connections are in the automotive industry often provided with a PVC seam seal, irrespective of the materials used for the components. This effectively prevents corrosion in the region of the seam. If the components to be joined are made of aluminum, however, the seam seal can be omitted, in particular if the fold is completely filled with an adhesion agent, e.g. an adhesive. However, the complete filling of the fold with an adhesion agent has the disadvantage that it usually involves considerable expense in terms of component and/or plant cleaning. This is mainly due to the fact that any surplus adhesion agent has to be removed without leaving a residue.

Alternative strategies in motor vehicle production involve the complete omission of seam seals and the acceptance of the risk of corrosion or the use of complex painting processes.

With regard to the sheet metal components used in the automotive industry, a further factor to be taken into account is that they are usually covered by a layer of paint which is produced by cathodic dip painting (CDP). With this type of component coating, it is vitally important that the entire surface of the components, in particular the sheet metal components, is completely covered by the CDP coating.

Exemplary embodiments of the present invention are directed to a component connection involving a fold in which the adhesion agent is applied without any significant contamination of the visible surfaces of the components and the manufacturing plant. At the same time, complete coating should be possible, in particular by CDP coating, even in the region of the fold end. The folded connection reliably avoids any corrosion of the components irrespective of the omission of a seam seal.

According to the invention, a component connection between a first component and a second component, the first component having a fold which at least sections of an edge region of the second component engage, and at least sections of the components being bonded to one another by an adhesion agent in the region of the fold, is such that an end region of the fold is shaped in such a way that a distance between the first and second components increases towards the end region, so that a funnel-shaped, outward-opening gap is formed between the two components, in which the surfaces of the two components are either joined to each other by the adhesion agent or provided with a coating across their entire surface area.

In accordance with exemplary embodiments of the present invention, the end region of the fold is shaped such that the adhesion agent can be applied in a simple way while ensuring that the surfaces of the first and second components that surround the funnel- or wedge-shaped gap and that are not covered by the adhesion agent are provided with a coating that covers their entire surface. The end region of the fold is preferably deformed in such a way that the sheet metal end of the first component is offset by bending or folding.

The component connection according to the invention thereby represents a special type of fold formation. The special structural fold formation according to the invention allows for a reliable and good filling of the fold with adhesion agent and a proper, full-surface CDP coating. In this way, the fact that a seam seal is no longer required can create savings, irrespective of what material is used for the components. Moreover, the need for further treatment of the components because of potential adhesion agent contamination is avoided.

The adhesion agent applied between the first and second components, one of which has a fold, is preferably an adhesive. Alternatively, a solder can conceivably be used as an adhesion agent.

The end region of a fold formed according to the invention is bent or folded in such a way that the distance between the first and second components increases towards the end region. The result of this design is a wedge- or funnel-shaped opening between the first and second components in the end region of the fold, to which opening an adhesion agent, in particular an adhesive, can be applied in a suitable manner. The adhesive that is used advantageously as an adhesion agent is applied in such a way that the open region between the first and second components is filled with the adhesive on the one hand, while the openly accessible surfaces of the components in the end region of the fold are provided with a CDP coating covering the entire surface on the other hand. This ensures that no adhesive runs out of the edge region of the fold while the whole surface of the components is reliably provided with a CDP coating even in the end region of the fold.

The method according to the invention for producing a component connection by means of a fold can in principle be used for any sheet metals, in particular irrespective of the material used. In accordance with an aspect of the invention the components to be joined are aluminum components, in particular aluminum sheets.

The invention is described in greater detail below with reference to an embodiment and to the figures without restricting the general inventive idea.

BRIEF DESCRIPTION OF THE DRAWING FIGURES

Of the figures:
FIG. 1 shows a folded connection of prior art; and
FIG. 2 shows a folded connection according to the invention.

DETAILED DESCRIPTION

FIG. 1 shows the design of a folded connection as known from prior art. The first component 5 has a fold 1 into which the edge region of a second component 6 projects. The components 5, 6 joined to one another in this embodiment are aluminum sheets. The surfaces of both components 5, 6 are provided with a CDP coating 2. In an end region 4 of the fold 1, however, there is a gap 7 that does not have a complete CDP coating 2. In this region, a coating covering the entire surface of the sheets 5, 6 cannot be produced reliably. Moreover, in a rear part of the end region 4 at a greater distance from the opening, the surfaces of the two components 5, 6 include an area that is not coated. This surface area is not provided with a CDP coating 2 or with adhesive 3. As a reliable coating of the components 5, 6 in the region of the fold cannot be ensured in the fold formation shown in FIG. 1, a component connection of this type is highly liable to corrosion in this region.

Figure 2:
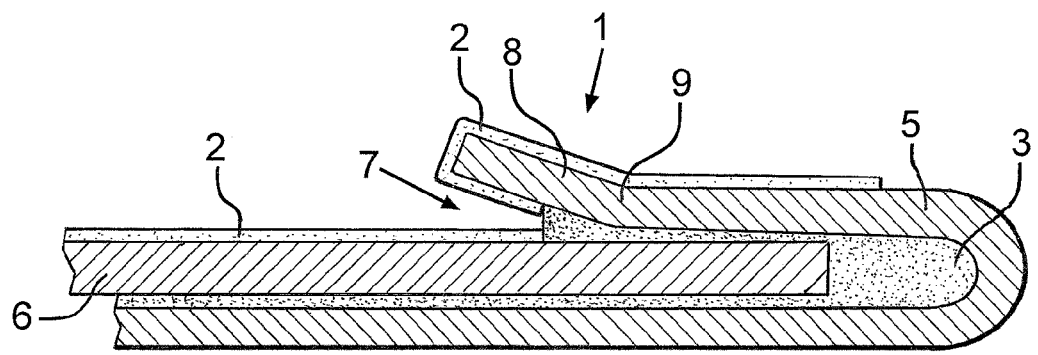

The problem described above is solved by a folded connection according to the invention as shown in FIG. 2. An essential feature of the fold 1 of the sheet 5 into which an edge region of the sheet 6 projects is the end region 8 of the sheet 5, which is bent away from the sheet 6 and thereby offset. Such a bent end region 8 of the fold 1 first produces a funnel- or wedge-shaped opening 7 in the end region of the fold 1 between the two components 5, 6 to be joined, which opening widens from the edge region of the sheet 6. The deformation 8 in the end region of the fold extends from a bending or folding line 9 which extends at least approximately parallel to the sheet end edge of the first sheet 5 to the sheet end edge of the first sheet. The design of the end region of the fold 1 as shown in the drawing in particular allows a reliable application of an adhesive 3.

In this context, it is possible either to apply the adhesive 3 to at least one of the components before the component 6 is inserted into the fold 1 or to apply the adhesive to the funnel-shaped opening 7 after joining the components 5, 6. In either case, the essential aspect is that the adhesive 3 is applied in the deformed end region 8 between the component 5 and the component 6 in such a way that, on the one hand, the surfaces of the components 5, 6 are wetted by the adhesive in a rear region of the opening 7 and thus bonded to one another and, on the other hand, the distance between the components 5, 6 in the front region of the opening 7 is, owing to the deformation 8 of the fold 1, large enough to ensure that the entire surface of the two components 5, 6 is provided with a CDP coating 2. As a result of the deformation 8 of the end region of the fold 1 as shown in FIG. 2 and of the full-surface coating or adhesive wetting related thereto, corrosion is reliably prevented in this region.

The fold formation according to the invention is therefore based on the concept that, due to the deformation 8 of the end region of the fold 1 in the form of a folding of the first component 5, the usual gap between the components 5, 6, which makes a reliable, full-surface CDP coating virtually impossible, does not exist. On the contrary, the surfaces of the components 5, 6 that surround the opening 7 are wetted with an adhesive 3 or wholly provided with a CDP coating 2. The fold formation according to the invention therefore reliably avoids corrosion in this region without requiring a special seam seal, such as a PVC seam seal.

The design of the end region of the fold 1 according to the invention as shown in FIG. 2 further ensures that the components are not contaminated by excess adhesive 2. After the production of the folded connection, the components 5, 6 therefore do not have to be specially cleaned, and they can be handled before the adhesive is completely dry without resulting in the contamination of handling equipment or operators.

The technical solution according to the invention therefore ensures that two components 5, 6, one of which has a fold 1, can be joined reliably by means of an adhesive 3 applied between the components 5, 6 in the region of the fold 1, without any adhesive 3 running out of the fold. At the same time, it is ensured that the sheets 5, 6 can be reliable provided with a CDP coating 2 even in the region of the fold end, so that corrosion in this region is reliably avoided without having to provide corrosion protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A component connection, comprising:
   a first component; and
   a second component, the first component having a fold that at least sections of an edge region of the second component engage, and at least sections of the first and second components are bonded to one another by an adhesion agent in the region of the fold,
   wherein an end region of the fold, which is located between a folding edge or bending line and an end edge of the first component, is shaped in such a way that a distance between the first and second components increases towards the end region, so that a funnel-shaped, outward-opening gap is formed between the first and second components, wherein the outward-opening gap has a first portion in which opposing surfaces of the first and second components are joined to each other by the adhesion agent but the opposing surfaces do not have a coating and a second portion in which opposing surfaces of the first and second components are provided with a coating across their entire surface area but the opposing surfaces do not have any adhesion agent, wherein the first portion is arranged towards the end region of the fold and extends beyond the folding edge or bending line and the second portion is arranged directly adjacent to the first portion, and
   wherein a leading edge of the second component engages in the fold of the first component beyond the folding edge or bending line of the first component.

2. The component connection according to claim 1, wherein the adhesion agent is an adhesive.

3. The component connection according to claim 1, wherein the adhesion agent is a solder.

4. The component connection according to claim 1, wherein the coating is a cathodic dip painting (CDP) coating.

5. The component connection according to claim 1, wherein at least one of the first and second components is made of an aluminum alloy.

6. The component connection according to claim 1, wherein an angle between the opposing surfaces of the first and second components in an area between the folding edge or bending line and an end edge of the first component is larger than an angle between the opposing surfaces of the first and second components in an area between the folding edge or bending line and the leading edge of the second component.

* * * * *